(12) United States Patent
Yogo et al.

(10) Patent No.: US 12,474,627 B2
(45) Date of Patent: Nov. 18, 2025

(54) LIGHT SOURCE DEVICE AND PROJECTION IMAGE DISPLAY DEVICE

(71) Applicant: Panasonic Intellectual Property Management Co., Ltd., Osaka (JP)

(72) Inventors: Takanori Yogo, Kyoto (JP); Michihiro Okuda, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 383 days.

(21) Appl. No.: 18/196,782

(22) Filed: May 12, 2023

(65) Prior Publication Data
US 2023/0280643 A1    Sep. 7, 2023

Related U.S. Application Data

(63) Continuation of application No. PCT/JP2021/040918, filed on Nov. 8, 2021.

(30) Foreign Application Priority Data

Nov. 13, 2020   (JP) ................................. 2020-189745

(51) Int. Cl.
*G03B 21/20* (2006.01)
*G02B 27/28* (2006.01)

(52) U.S. Cl.
CPC ......... *G03B 21/208* (2013.01); *G02B 27/283* (2013.01); *G03B 21/2013* (2013.01);
(Continued)

(58) Field of Classification Search
CPC .............. G03B 21/208; G03B 21/2073; G03B 21/2066; G03B 21/2013; G03B 21/2033;
(Continued)

(56) References Cited

U.S. PATENT DOCUMENTS 5,790,574 A * 8/1998 Rieger .................. H01S 3/2333
                                                    372/18
6,762,879 B1 * 7/2004 Li ........................ G02B 27/283
                                                    385/11
(Continued)

FOREIGN PATENT DOCUMENTS

JP      2007-264340      10/2007
JP      2008-107521       5/2008
(Continued)

OTHER PUBLICATIONS

International Search Report issued Jan. 25, 2022 in International (PCT) Application No. PCT/JP2021/040918.

*Primary Examiner* — Bao-Luan Q Le
(74) *Attorney, Agent, or Firm* — Wenderoth, Lind & Ponack, L.L.P.

(57) ABSTRACT

A light source device includes: a first light source that emits light of first linear polarization; a half mirror that separates emitted light from the first light source into first light traveling to a first optical path and second light traveling to a second optical path; a polarized light combination mirror that combines the first light and the second light; an optical path change element that is disposed on the second optical path and reflects the second light and guides the second light to the polarized light combination mirror; and a retardation plate that is disposed on the second optical path and converts the second light into second linear polarization inclined with respect to the first linear polarization. The optical path change element is disposed such that point images of the first light and point images of the second light on the polarized light combination mirror are alternately arranged.

11 Claims, 11 Drawing Sheets

(52) U.S. Cl.
CPC ..... *G03B 21/2033* (2013.01); *G03B 21/2066* (2013.01); *G03B 21/2073* (2013.01)

(58) Field of Classification Search
CPC . G02B 27/0905; G02B 27/283; G02B 27/286
See application file for complete search history.

(56) References Cited

U.S. PATENT DOCUMENTS

| | | | | |
|---|---|---|---|---|
| 8,388,138 | B1* | 3/2013 | Boothroyd | H04N 9/3167 359/464 |
| 8,998,447 | B2* | 4/2015 | Svensen | G03B 21/2066 362/241 |
| 9,904,159 | B2* | 2/2018 | Chen | G03B 21/2013 |
| 10,175,566 | B2* | 1/2019 | Matsubara | G02B 19/00 |
| 10,613,341 | B2* | 4/2020 | Nothern, III | H01S 5/0071 |
| 10,690,931 | B2* | 6/2020 | Otani | G02B 27/286 |
| 10,782,600 | B2* | 9/2020 | Pan | G03B 21/005 |
| 11,106,120 | B2* | 8/2021 | Chou | G03B 21/2033 |
| 11,194,240 | B2* | 12/2021 | Kurata | G03B 21/2013 |
| 11,422,451 | B2* | 8/2022 | Akiyama | G03B 21/2013 |
| 11,681,211 | B2* | 6/2023 | Akiyama | G03B 21/2013 353/20 |
| 11,754,915 | B2* | 9/2023 | Kurata | F21S 2/00 353/20 |
| 11,874,590 | B2* | 1/2024 | Wang | G03B 21/142 |
| 2005/0111772 | A1* | 5/2005 | Du | G02B 6/12007 385/11 |
| 2008/0088815 | A1* | 4/2008 | Nomura | G03F 7/70058 355/71 |
| 2009/0168818 | A1* | 7/2009 | Gollier | G02B 27/283 372/27 |
| 2009/0284708 | A1* | 11/2009 | Abdulhalim | B82Y 20/00 359/260 |
| 2012/0008098 | A1* | 1/2012 | Akiyama | F21S 41/148 353/30 |
| 2012/0133903 | A1* | 5/2012 | Tanaka | G03B 21/2066 353/31 |
| 2012/0275149 | A1* | 11/2012 | Huang | G02B 27/102 362/235 |
| 2013/0100456 | A1* | 4/2013 | Yu | G01B 9/02014 356/479 |
| 2013/0100974 | A1* | 4/2013 | Janssens | G03B 21/2013 362/235 |
| 2014/0354956 | A1* | 12/2014 | Yamada | H04N 9/3164 353/20 |
| 2015/0029467 | A1* | 1/2015 | Sugiyama | G03B 21/204 353/31 |
| 2015/0249521 | A1* | 9/2015 | Ono | G02B 27/48 398/65 |
| 2015/0270682 | A1* | 9/2015 | Daniels | G03B 21/16 362/235 |
| 2016/0062223 | A1* | 3/2016 | Akiyama | G03B 21/2013 353/31 |
| 2016/0198135 | A1* | 7/2016 | Kita | F21V 9/08 348/756 |
| 2017/0146803 | A1* | 5/2017 | Kishigami | H04N 9/3161 |
| 2017/0343891 | A1* | 11/2017 | Sakata | G03B 21/2013 |
| 2018/0252993 | A1* | 9/2018 | Akiyama | G03B 21/204 |
| 2018/0341170 | A1* | 11/2018 | Lim | H04N 9/3167 |
| 2019/0129189 | A1* | 5/2019 | Chang | G02B 27/149 |
| 2019/0171096 | A1* | 6/2019 | Yamagata | G03B 21/2066 |
| 2019/0310539 | A1* | 10/2019 | Yamagishi | G03B 21/204 |
| 2019/0394429 | A1* | 12/2019 | Tanaka | H04N 13/334 |
| 2020/0201162 | A1* | 6/2020 | Sudo | F21S 2/00 |
| 2020/0253469 | A1* | 8/2020 | Sarenac | G02F 1/21 |
| 2020/0301156 | A1* | 9/2020 | Nagahara | G02B 27/283 |
| 2020/0301264 | A1* | 9/2020 | Hu | H05B 47/155 |
| 2021/0191250 | A1* | 6/2021 | Kurita | G03B 33/12 |
| 2021/0286247 | A1* | 9/2021 | Hsu | G03B 21/2066 |
| 2021/0294196 | A1* | 9/2021 | Uehara | G03B 21/2013 |
| 2022/0214606 | A1* | 7/2022 | Katayama | H04N 5/74 |
| 2022/0283486 | A1* | 9/2022 | Akiyama | G02B 27/1053 |
| 2022/0299859 | A1 | 9/2022 | Kurita et al. | |
| 2022/0373874 | A1* | 11/2022 | Lin | G03B 21/2066 |
| 2022/0382138 | A1* | 12/2022 | Ohkawa | F21V 5/04 |

FOREIGN PATENT DOCUMENTS

| | | |
|---|---|---|
| JP | 2012-181260 | 9/2012 |
| JP | 2017-211603 | 11/2017 |
| JP | 2021-99484 | 7/2021 |

* cited by examiner

LIGHT SOURCE DEVICE AND PROJECTION IMAGE DISPLAY DEVICE

TECHNICAL FIELD

The present disclosure relates to, for example, a light source device and a projection image display device including the light source device.

BACKGROUND ART

Conventionally, since linear light emitted from a plurality of solid-state light source elements such as laser light sources is coherent light, there may appear an interference pattern called a speckle pattern in which bright spots and dark spots are randomly distributed.

In PTL 1, occurrence of speckles is reduced by polarization multiplexing in which light emitted from one light source is separated into optical paths in accordance with type of polarization and the separated light is further combined.

CITATION LIST

Patent Literature

PTL 1: Unexamined Japanese Patent Publication No. 2008-107521

SUMMARY OF THE INVENTION

However, in the case of using the solid-state light source elements, since the polarization of the light emitted from the light source is uniform, the ratios of the light beams to be separated are greatly different, and the advantage of separating in accordance with type of polarization is impaired.

An object of the present disclosure is to provide a light source device and a projection image display device that reduce speckles.

A light source device of the present disclosure includes: a first light source including a plurality of solid-state light source elements that are two-dimensionally arrayed at a predetermined pitch and emit light of first linear polarization; a half mirror that reflects and transmits emitted light from the first light source and separates the emitted light into first light traveling to a first optical path and second light traveling to a second optical path; a polarized light combination mirror that transmits and reflects light in accordance with type of polarization, and combines the first light and the second light; an optical path change element that is disposed on the second optical path and reflects the second light to guide the second light to the polarized light combination mirror; and a retardation plate that is disposed on the second optical path and converts the second light into second linear polarization inclined with respect to the first linear polarization. The optical path change element is disposed such that point images of the first light and point images of the second light on the polarized light combination mirror are alternately arranged in a short-diameter direction of the point images of the first light and the point images of the second light.

The light source device of the present disclosure further includes a second light source including a plurality of solid-state light source elements that are two-dimensionally arrayed at a predetermined pitch and emit light of first linear polarization. The half mirror reflects and transmits emitted light from the second light source, and separates the emitted light from the second light source into third light traveling to the first optical path and fourth light traveling to the second optical path. The polarized light combination mirror combines the first light, the second light, the third light, and the fourth light. The optical path change element reflects the fourth light and guides the fourth light to the polarized light combination mirror. The retardation plate converts the fourth light into the second linear polarization. The first light source and the second light source are disposed such that the point images of the emitted light from the first light source and point images of the emitted light from the second light source on the half mirror are alternately arranged in a long-diameter direction of the point images of the emitted light from the first light source and the point images of the emitted light from the second light source. The optical path change element is disposed such that point images of the third light and point images of the fourth light on the polarized light combination mirror are alternately arranged in a short-diameter direction of the point images of the third light and the point images of the fourth light.

A projection image display device according to the present disclosure includes: the above-described light source device; a light modulation element that modulates light incident from the light source device, based on an external signal; and a projection lens that magnifies and projects the light modulated by the light modulation element.

The light source device and the projection image display device in the present disclosure can provide a light source device and a projection image display device with reduced speckles.

DESCRIPTION OF EMBODIMENT

Hereinafter, exemplary embodiments will be described in detail with reference to the drawings as appropriate. However, unnecessarily detailed description may be omitted. For example, detailed description of already well-known matters and repeated description of substantially the same configuration may be omitted. This is to avoid the following description from being unnecessarily redundant, and to facilitate those skilled in the art to understand the description.

Note that the inventor (or inventors) provides the accompanying drawings and the following description to help those skilled in the art to sufficiently understand the present disclosure, but does not intend to use the drawings or the description to limit the subject matters of the claims.

First Exemplary Embodiment

A first exemplary embodiment will be described below with reference to FIGS. 1 and 2.

1-1. Configuration

Figure 1:
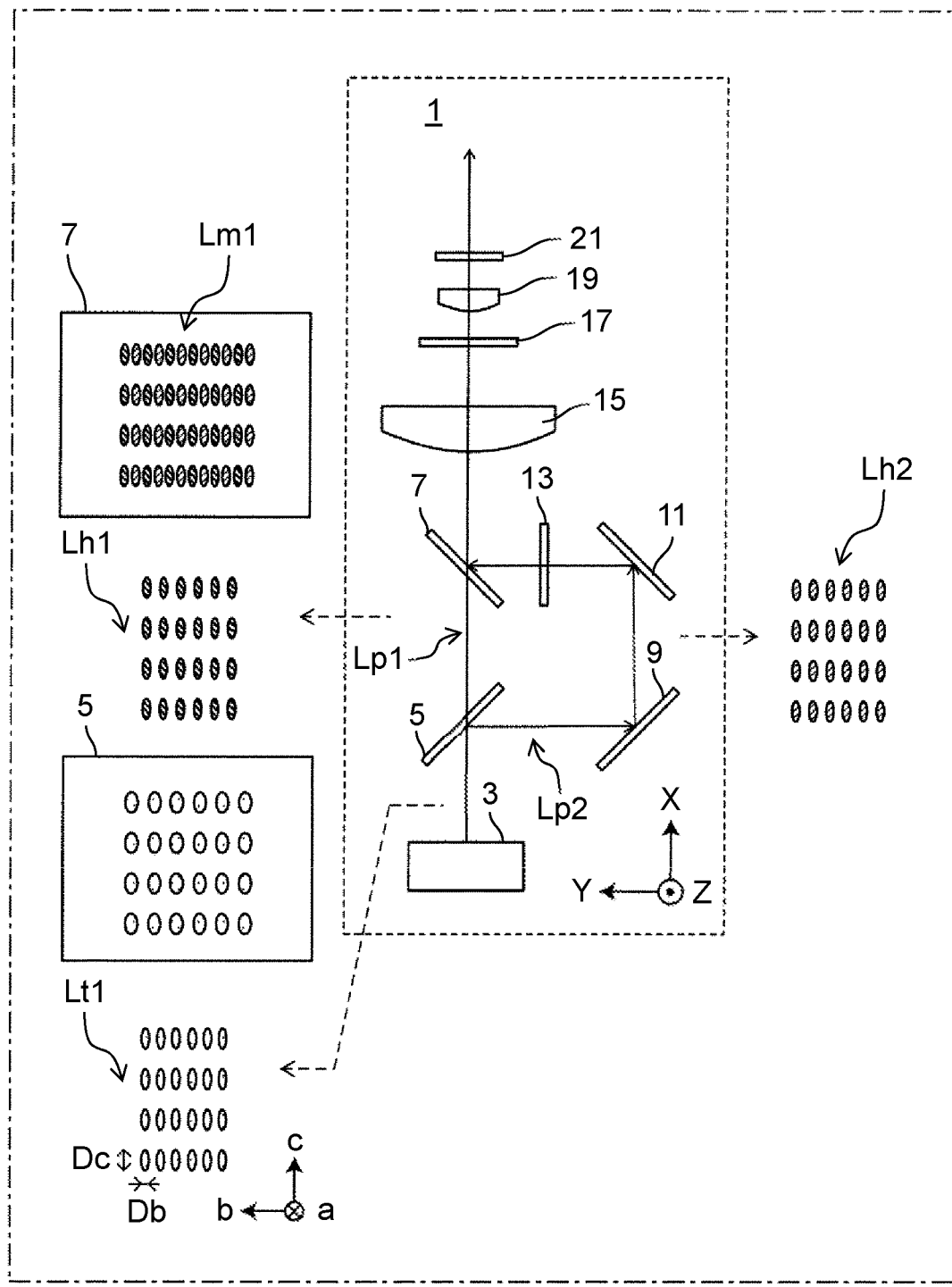
FIG. 1 is a schematic diagram illustrating a configuration of a light source device and point images of laser light according to a first exemplary embodiment of the present disclosure.
Figure 2:
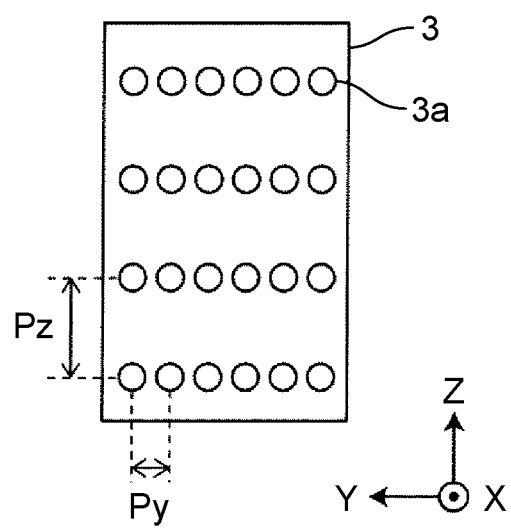
FIG. 2 is a schematic diagram illustrating a configuration of a first light source.

FIG. 1 is a schematic diagram illustrating a configuration of light source device 1 and point images of laser light in the first exemplary embodiment of the present disclosure. FIG. 2 is a schematic diagram illustrating a configuration of first light source 3. For convenience of the following description, the XYZ orthogonal coordinate system shown in FIG. 1 is adopted in the drawing. Further, emitted light that is emitted from first light source 3 will be described by using the abc orthogonal coordinate system shown in the drawing.

Light source device 1 includes first light source 3, half mirror 5, first polarized light combination mirror 7, mirror 9 (an example of a first mirror), mirror 11 (an example of a second mirror), and retardation plate 13.

First light source 3 is, for example, a light source array having a plurality of solid-state light source elements 3a arranged in two-dimensional directions defined by the Y direction and the Z direction and collimator lenses arranged corresponding to respective ones of solid-state light source elements 3a. Specifically, the plurality of solid-state light source elements 3a are two-dimensionally arrayed as illustrated in FIG. 2. Solid-state light source elements 3a are arranged at predetermined pitches. In the first exemplary embodiment, for example, 24 solid-state light source elements 3a of 4 rows by 6 columns are arranged. Solid-state light source elements 3a are, for example, semiconductor lasers. Optical axes of light beams emitted from respective ones of solid-state light source elements 3a are parallel. Each of first emitted light beams Lt1 emitted from respective ones of solid-state light source elements 3a is, for example, P-polarized laser light as a first linear polarization and has an elliptical shape having a short diameter Db and a long diameter Dc.

Half mirror 5 reflects and transmits first emitted light beams Lt1 emitted from first light source 3, and separates first emitted light beams Lt1 into first light Lh1 traveling to first optical path Lp1 and second light Lh2 traveling to second optical path Lp2. First optical path Lp1 is a straight optical path from half mirror 5 to first polarized light combination mirror 7. Second optical path Lp2 is a bypass optical path having a longer distance than first optical path Lp1. Second optical path Lp2 is, for example, an optical path from half mirror 5 to first polarized light combination mirror 7 via mirrors 9, 11 and retardation plate 13. Half mirror 5 is a mirror in which a ratio between transmission and reflection of an incident light beam is adjusted, and is a mirror in which part of the incident light beam is transmitted and part of the incident light beam is reflected. In that sense, the ratio between transmission and reflection does not need to be one to one, and the ratio can be appropriately adjusted.

Mirror 9 and mirror 11 as optical path change elements are arranged on second optical path Lp2, reflect second light Lh2 to guide second light Lh2 to first polarized light combination mirror 7. Mirror 9 and mirror 11 change the direction of second optical path Lp2.

Retardation plate 13 is disposed on second optical path Lp2 and converts second light Lh2 being transmitted therethrough, into S-polarization inclined with respect to P-polarization. Retardation plate 13 is, for example, a half-wave plate ($\lambda/2$ plate). In FIG. 1, retardation plate 13 is disposed between mirror 11 and the polarized light combination mirror. However, retardation plate 13 may be disposed at another place as long as retardation plate 13 is disposed on second optical path Lp2. For example, retardation plate 13 may be disposed between half mirror 5 and mirror 9 or between mirror 9 and mirror 11.

First polarized light combination mirror 7 transmits and reflects light in accordance with type of polarization, and combines first light Lh1 and second light Lh2. First polarized light combination mirror 7 is, for example, a polarization beam splitter. For example, first polarized light combination mirror 7 has a property of transmitting light of P-polarization and reflecting light of S-polarization light. Therefore, first light Lh1 traveling on first optical path Lp1 is transmitted through first polarized light combination mirror 7. In addition, second light Lh2 traveling on second optical path Lp2 is reflected by first polarized light combination mirror 7 to the traveling direction of first light Lh1. In this manner, first light Lh1 and second light Lh2 are combined.

Light source device 1 further includes lens 15, diffuser plate 17, lens 19, and diffuser plate 21. Diffuser plate 21 can vibrate in a planar direction (YZ plane) orthogonal to the optical axis. As a result, speckles can be further reduced. Combined light Lm1 combined by first polarized light combination mirror 7 is emitted to the outside through lens 15, diffuser plate 17, lens 19, and diffuser plate 21.

Next, it will be described that the number of light beams of first emitted light beams Lt1 emitted from first light source 3 is increased by separation and combination. First emitted light beams Lt1 emitted from first light source 3 is P-polarized laser light, and half mirror 5 is irradiated with the light beams corresponding to the arrangement pitch of solid-state light source elements 3a.

Half mirror 5 is disposed to be inclined by approximately 450 with respect to first emitted light beams Lt1. As a result, the point image of each of first emitted light beams Lt1 applied onto half mirror 5 spreads in a direction of the short diameter Db wider than first emitted light beams Lt1 traveling in a space.

First emitted light beams Lt1 are separated by half mirror 5 into first light Lh1 that passes through half mirror 5 and travels straight and second light Lh2 that is reflected by half mirror 5 and takes a bypass route.

The light beams of first light Lh1 traveling on first optical path Lp1 have the same pitch as the light beams of first emitted light beams Lt1. First light Lh1 enters first polarized light combination mirror 7.

The light beams of second light Lh2 traveling on second optical path Lp2 from half mirror 5 have the same pitch as the light beams of first emitted light beams Lt1. Second light Lh2 changes its traveling direction when reflected by mirror 9 and mirror 11. In addition, mirror 9 and mirror 11 are disposed such that the center of each of the point images of first light Lh1 and the center of each of the point images of second light Lh2 are positioned not to overlap each other on first polarized light combination mirror 7. Mirror 9 and mirror 11 are disposed such that the point images of first light Lh1 and the point images of the second light on first polarized light combination mirror 7 are alternately arranged. For example, on first polarized light combination mirror 7, the point images of the light beams of second light Lh2 are located between the point images of respective ones of light beams of first light Lh1 in the direction of the short diameter Db (Y direction) of the light beams of first light Lh1. Here, as illustrated in FIG. 1, each of the point images of first light Lh1 and the point images of second light Lh2 has an elliptical shape. This elliptical shape has a short diameter and a long diameter orthogonal to each other.

Therefore, combined light Lm1 in which first light Lh1 and second light Lh2 are combined on first polarized light combination mirror 7 has light beams twice as many as the light beams of first emitted light beams Lt1. In addition, as for the pitch of the light beams of combined light Lm1, the pitch in the direction of the long diameter Dc of the light beams is the same as the pitch of first emitted light beams Lt1, but the pitch in the direction of the short diameter Db is half the pitch of first emitted light beams Lt1. As described above, the number of solid-state light source elements $3a$ can be doubled in a pseudo manner, and the number of light beams can be accordingly increased, so that speckles can be suppressed.

1-2. Advantageous Effects and the Like

As described above, light source device 1 according to the first embodiment includes: first light source 3 that include the plurality of solid-state light source elements $3a$ arrayed at the predetermined pitches Py and Pz and emits light of P-polarization as the first linear polarization; and half mirror 5 that reflects and transmits first emitted light beams Lt1 from first light source 3, thereby separating first emitted light beams Lt1 into first light Lh1 traveling to first optical path Lp1 and second light Lh2 traveling to second optical path Lp2. In addition, light source device 1 includes: first polarized light combination mirror 7 that transmits and reflects first light Lh1 and second light Lh2 in accordance with type of polarization; and mirrors 9, 11 as optical path change elements that are disposed on second optical path Lp2 and reflect second light Lh2 to guide reflected second light Lh2 to first polarized light combination mirror 7. Light source device 1 further includes retardation plate 13 that is disposed on second optical path Lp2 and converts second light Lh2 into S-polarization as the second linear polarization inclined with respect to P-polarization. Mirrors 9, 11 are disposed such that the point images of first light Lh1 and the point images of second light Lh2 on first polarized light combination mirror 7 are alternately arranged.

First emitted light beams Lt1 are separated by half mirror 5, and the point images of the light beams of first light Lh1 traveling on the straight optical path and the point images of the light beams of second light Lh2 traveling on the bypass optical path are alternately arranged on first polarized light combination mirror 7, so that light source multiplexing can be achieved and speckles can be reduced.

Second Exemplary Embodiment

A second exemplary embodiment will be described below with reference to FIG. 3.

2-1. Configuration

Figure 3:
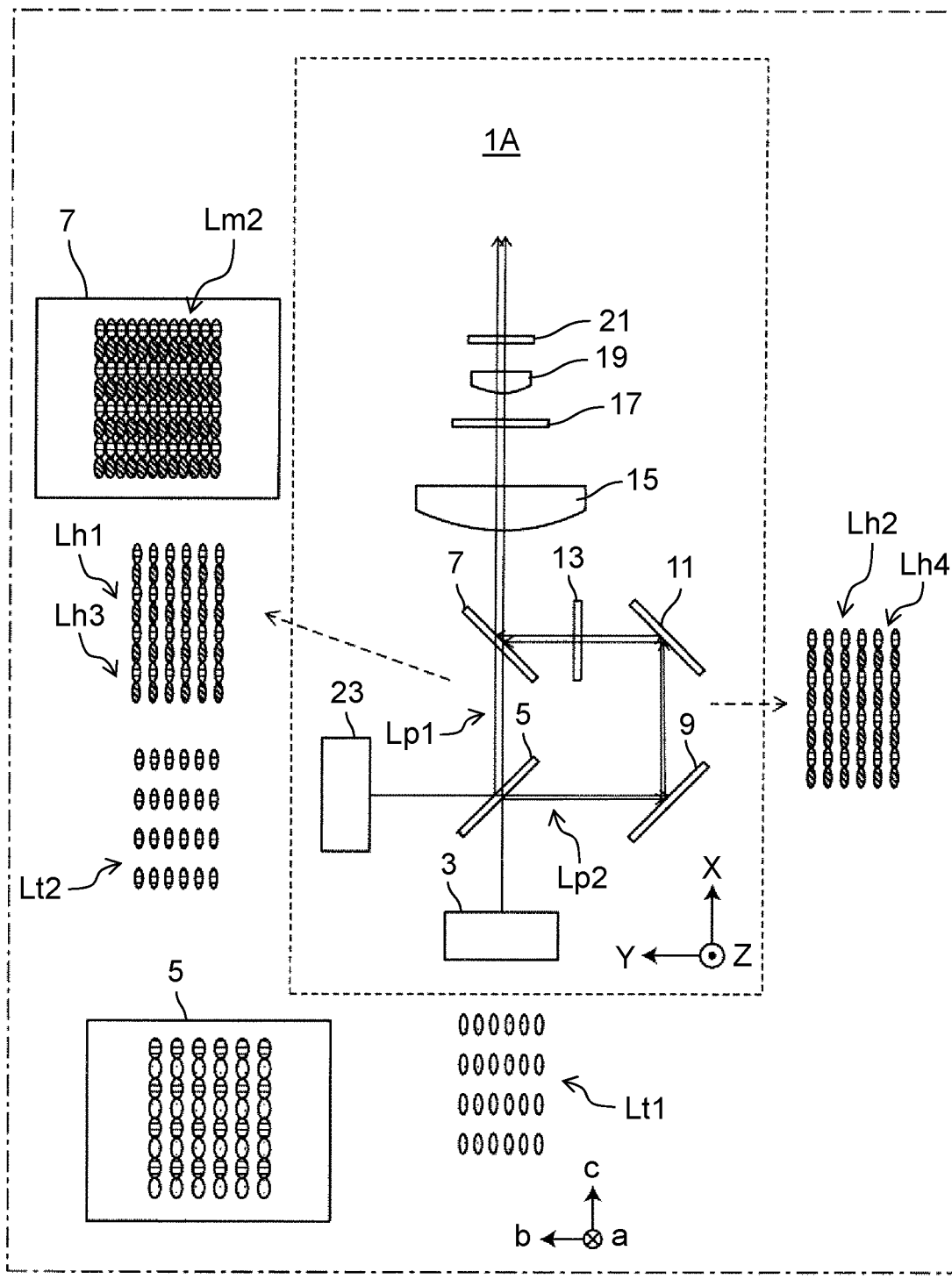
FIG. 3 is a schematic diagram illustrating a configuration of a light source device in a second exemplary embodiment of the present disclosure.

FIG. 3 is a schematic diagram illustrating a configuration of light source device TA in the second exemplary embodiment of the present disclosure.

Light source device TA of the second exemplary embodiment has a configuration in which another light source is added to light source device 1 of the first exemplary embodiment. The configuration except the above point and the point to be described below is common to light source device TA of the second exemplary embodiment and light source device 1 of the first exemplary embodiment.

Light source device TA includes, in the same manner as light source device 1: first light source 3; half mirror 5; first polarized light combination mirror 7; mirror 9; mirror 11; and retardation plate 13, and light source device TA further includes second light source 23.

Second light source 23 is, for example, a light source array having a plurality of solid-state light source elements $3a$ arranged in two-dimensional directions defined by the X direction and the Z direction and collimator lenses arranged corresponding to respective ones of solid-state light source elements $3a$. Solid-state light source elements $3a$ of second light source 23 are arrayed at the same pitches as solid-state light source elements $3a$ of first light source 3. Each of second emitted light beams Lt2 emitted from respective ones of solid-state light source elements $3a$ of second light source 23 is, for example, P-polarized laser light as a first linear polarization and has an elliptical shape having a short diameter Db and a long diameter Dc. First emitted light beams Lt1 and second emitted light beams Lt2 orthogonally cross each other on an plane, and half mirror 5 is disposed on the plane where first emitted light beams Lt1 and second emitted light beams Lt2 orthogonally cross.

Solid-state light source elements $3a$ of second light source 23 are disposed such that point images of the light beams of first emitted light beams Lt1 and point images of the light beams of second emitted light beams Lt2 do not overlap each other on the plane where first emitted light beams Lt1 and second emitted light beams Lt2 orthogonally cross each other, that is, on half mirror 5. For example, first light source 3 and second light source 23 are disposed such that the point images of the light beams of first emitted light beams Lt1 and the point images of the light beams of second emitted light beams Lt2 are shifted on half mirror 5 by a half pitch in the direction of the long diameter Dc direction (Z direction) of the point images.

In a similar manner to first emitted light beams Lt1, half mirror 5 reflects and transmits second emitted light beams Lt2 emitted from second light source 23, thereby separating second emitted light beams Lt2 into third light Lh3 traveling to first optical path Lp1 and fourth light Lh4 traveling to second optical path Lp2. Therefore, the light obtained by combining first light Lh1 and third light Lh3 travels on first optical path Lp1, and the light obtained by combining second light Lh2 and fourth light Lh4 travels on second optical path Lp2.

In a similar manner to second light Lh2, mirror 9 and mirror 11 reflect fourth light Lh4 to guide fourth light Lh4 to first polarized light combination mirror 7.

In a similar manner to second light Lh2, retardation plate 13 converts fourth light Lh4 into S-polarization inclined with respect to P-polarization.

First polarized light combination mirror 7 transmits and reflects light in accordance with type of polarization, and combines first light Lh1, second light Lh2, third light Lh3, and fourth light Lh4. First light Lh1 and third light Lh3 traveling on first optical path Lp1 are transmitted through first polarized light combination mirror 7. In addition, second light Lh2 and fourth light Lh4 traveling on second optical path Lp2 are reflected by first polarized light combination mirror 7 to the traveling direction of first light Lh1 and third light Lh3. In this manner, first light Lh1 to fourth light Lh4 are combined.

Next, it will be described that the number of light beams of second emitted light beams Lt2 is increased by separation and combination. Second emitted light beams Lt2 emitted from second light source 23 is P-polarized laser light, and half mirror 5 is irradiated with the light beams corresponding to the arrangement pitch of solid-state light source elements 3a.

Half mirror 5 is disposed to be inclined by approximately 450 also with respect to second emitted light beams Lt2. As a result, the point image of each of second emitted light beams Lt2 applied onto half mirror 5 spreads in a direction of the short diameter Db wider than second emitted light beams Lt2 traveling in a space.

Second emitted light beams Lt2 are separated into third light Lh3 that is reflected by half mirror 5 and travels to first optical path Lp1 and fourth light Lh4 that passes through half mirror 5 and travels to second optical path Lp2, which is a bypass route.

The light beams of third light Lh3 traveling on first optical path Lp1 have the same pitch as the light beams of second emitted light beams Lt2. Third light Lh3 enters first polarized light combination mirror 7 together with first light Lh1.

The light beams of second light Lh2 traveling on second optical path Lp2 from half mirror 5 have the same pitch as the light beams of first emitted light beams Lt1. Second light Lh2 changes its traveling direction when reflected by mirror 9 and mirror 11. In addition, mirror 9 and mirror 11 are disposed such that the center of each of the point images of first light Lh1 and the center of each of the point images of second light Lh2 are positioned not to overlap each other on first polarized light combination mirror 7. Mirror 9 and mirror 11 are disposed such that the point images of first light Lh1 and the point images of the second light on first polarized light combination mirror 7 are alternately arranged. For example, on first polarized light combination mirror 7, the point images of the light beams of second light Lh2 are located between the point images of respective ones of light beams of first light Lh1 in the direction of the short diameter Db (Y direction) of the light beams of first light Lh1.

Therefore, combined light Lm2 in which first light Lh1 to fourth light Lh4 are combined on first polarized light combination mirror 7 has light beams corresponding to emitted from light sources the number of which corresponds to twice the number. In addition, as for the pitch of the light beams of combined light Lm2, the pitch of each of the direction of the long diameter Dc and the direction of the short diameter Db is decreased by half compared with first emitted light beams Lt1 and second emitted light beams Lt2. As described above, the number of the light sources can be quadrupled in a pseudo manner, and the number of light beams can be accordingly increased, so that speckles can be suppressed.

2-2. Advantageous Effects and the Like

As described above, light source device TA in the second exemplary embodiment includes: first light source 3 including the plurality of solid-state light source elements 3a that are arrayed in two-dimensional directions at the predetermined pitches Py and Pz and emit light of P-polarization as the first linear polarization; and second light source 23 including the plurality of solid-state light source elements 3a that are arrayed in two-dimensional directions at the predetermined pitches Py and Pz and emit light of the first linear polarization. Light source device TA includes half mirror 5 that reflects and transmits first emitted light beams Lt1 from first light source 3, thereby separating first emitted light beams Lt1 into first light Lh1 traveling to first optical path Lp1 and second light Lh2 traveling to second optical path Lp2. Half mirror 5 reflects and transmits the emitted light from second light source 23, thereby separating the emitted light into third light Lh3 traveling to first optical path Lp1 and fourth light Lh4 traveling to second optical path Lp2. In addition, light source device TA includes: first polarized light combination mirror 7 that transmits and reflects first light Lh1, second light Lh2, third light Lh3, and fourth light Lh4 in accordance with type of polarization; and mirrors 9, 11 as optical path change elements that are disposed on second optical path Lp2 and reflect second light Lh2 and fourth light Lh4 to guide reflected second light Lh2 and fourth light Lh4 to first polarized light combination mirror 7. Light source device 1 further includes retardation plate 13 that is disposed on second optical path Lp2 and converts second light Lh2 and fourth light Lh4 into S-polarization as the second linear polarization inclined with respect to P-polarization. First light source 3 and second light source 23 are disposed such that the point images of first emitted light beams Lt1 from first light source 3 and the point images of emitted light Lt2 from second light source 23 on half mirror 5 are alternately arranged in the direction of the long diameter Dc.

First emitted light beams Lt1 and second emitted light beams Lt2 are separated by half mirror 5, and the point images of respective ones of the light beams of first light Lh1 and third light Lh3 traveling on the straight optical path and the point images of respective ones of the light beams of second light Lh2 and fourth light Lh4 traveling on the bypass optical path are alternately arranged on first polarized light combination mirror 7, so that light source multiplexing can be achieved and speckles can be reduced.

Third Exemplary Embodiment

A third exemplary embodiment will be described below with reference to FIG. 4.

3-1. Configuration

Figure 4:
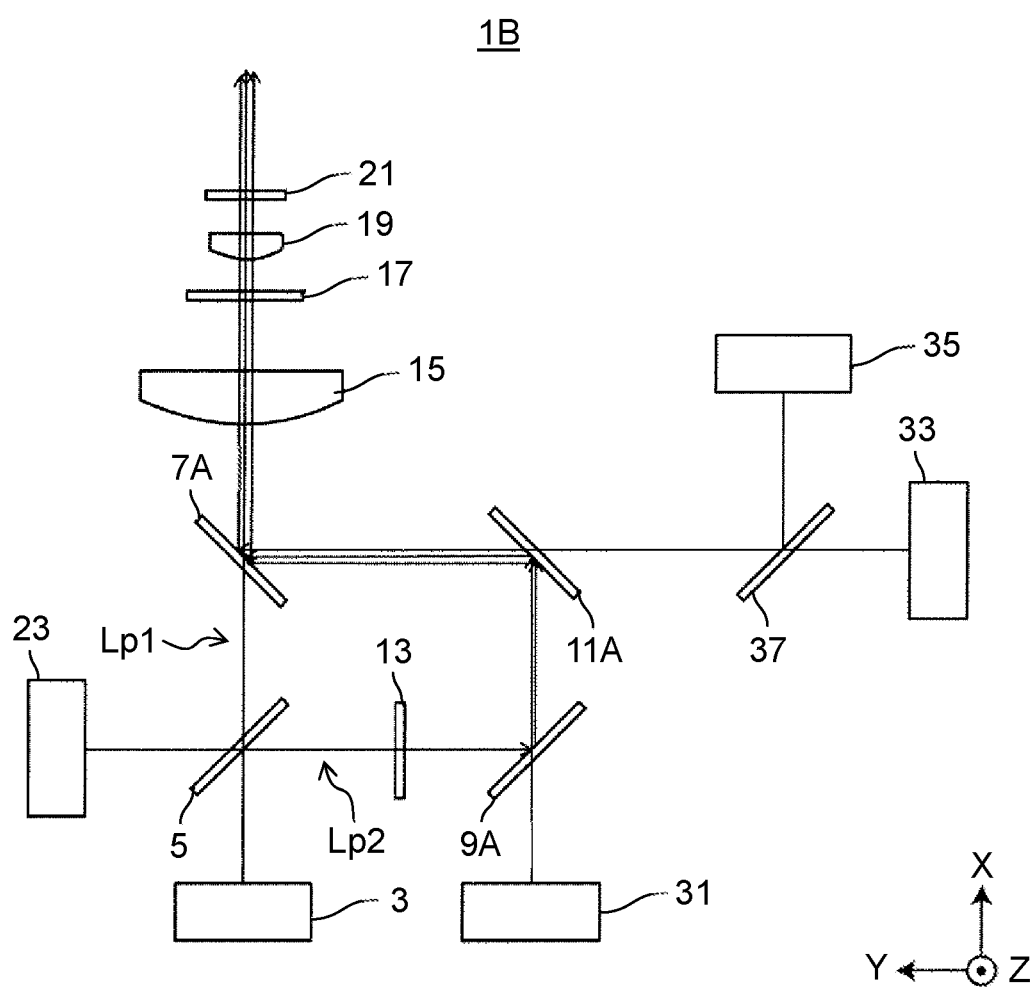
FIG. 4 is a schematic diagram illustrating a configuration of a light source device in a third exemplary embodiment of the present disclosure.

FIG. 4 is a schematic diagram illustrating a configuration of light source device 1B in the third exemplary embodiment of the present disclosure.

Light source device 1B of the third exemplary embodiment has a configuration in which another light source is added to light source device TA of the second exemplary embodiment. The configuration except the above point and the point to be described below is common to light source device 1B of the third exemplary embodiment and light source device 1A of the second exemplary embodiment.

Light source device 1B includes first light source 3, second light source 23, third light source 31, fourth light source 33, and fifth light source 35. Light source device 1B further includes half mirror 5, retardation plate 13, first dichroic mirror 9A, second dichroic mirror 11A, second polarized light combination mirror 7A, and third polarized light combination mirror 37.

Each of solid-state light source elements 3a of first light source 3 and second light source 23 emits, for example, green laser light. The laser light emitted from each of first light source 3 and second light source 23 is light of P-polarization.

An optical path leading directly from half mirror 5 to second polarized light combination mirror 7A is first optical path Lp1, and an optical path bypassing from half mirror 5 to second polarized light combination mirror 7A via, for example, first dichroic mirror 9A and second dichroic mirror 11A is second optical path Lp2.

Third light source 31 has a similar configuration to first light source 3, and each of solid-state light source elements 3a of third light source 31 emits, for example, blue laser light. The emitted blue laser light travels toward first dichroic mirror 9A.

First dichroic mirror 9A is disposed parallel to half mirror 5. First dichroic mirror 9A reflects light incident from half mirror 5 and transmits light incident from third light source 31. For example, first dichroic mirror 9A reflects green laser light and transmits blue laser light. As a result, green second light Lh2 traveling on the second optical path and blue light are combined. The combined light of green and blue travels toward second dichroic mirror 11A.

Second dichroic mirror 11A reflects light incident from the first dichroic mirror and transmits light from the second polarized light combination mirror.

Fourth light source 33 and fifth light source 35 both emit laser light of the same color. As for solid-state light source elements 3a of fifth light source 35, fifth light source 35 is disposed such that the emitted light is emitted in a state where the polarization of the emitted light is shifted by 90° from the polarization of each of solid-state light source elements 3a of the fourth light source 33. For example, each of solid-state light source elements 3a of fifth light source 35 is disposed in the state of being rotated by 90° with respect to the emission direction of each solid-state light source elements 3a of fourth light source 33. In this manner, for example, red laser light of P-polarization is emitted from fourth light source 33, and, for example, red laser light of S-polarization is emitted from fifth light source 35.

Third polarized light combination mirror 37 transmits the emitted light from fourth light source 33 and reflects the emitted light from fifth light source 35. In this manner, the emitted light emitted from each of fourth light source 33 and fifth light source 35 is combined by third polarized light combination mirror 37 and emitted toward second dichroic mirror 11A. For example, third polarized light combination mirror 37 transmits P-polarized laser light and reflects S-polarized laser light.

Second dichroic mirror 11A transmits, for example, red laser light and reflects green and blue laser light. Therefore, second dichroic mirror 11A reflects green laser light and blue laser light incident from first dichroic mirror 9A and transmits red laser light incident from third polarized light combination mirror 37, thereby combining green, blue, and red laser light. The combined laser light is emitted toward second polarized light combination mirror 7A.

Second polarized light combination mirror 7A combines green first light Lh1 traveling on first optical path Lp1 and the light in which green second light Lh2, the blue light, and the red light traveling on second optical path Lp2 are combined. The combined light of the three colors is emitted from second polarized light combination mirror 7A toward lens 15.

3-2. Advantageous Effects and the Like

As described above, in light source device 1B according to the third exemplary embodiment, light of one color among light of three colors is separated by half mirror 5, and the number of light beams is accordingly increased, so that speckles can be reduced.

Fourth Exemplary Embodiment

A fourth exemplary embodiment will be described below with reference to FIG. 5.

4-1. Configuration

Figure 5:
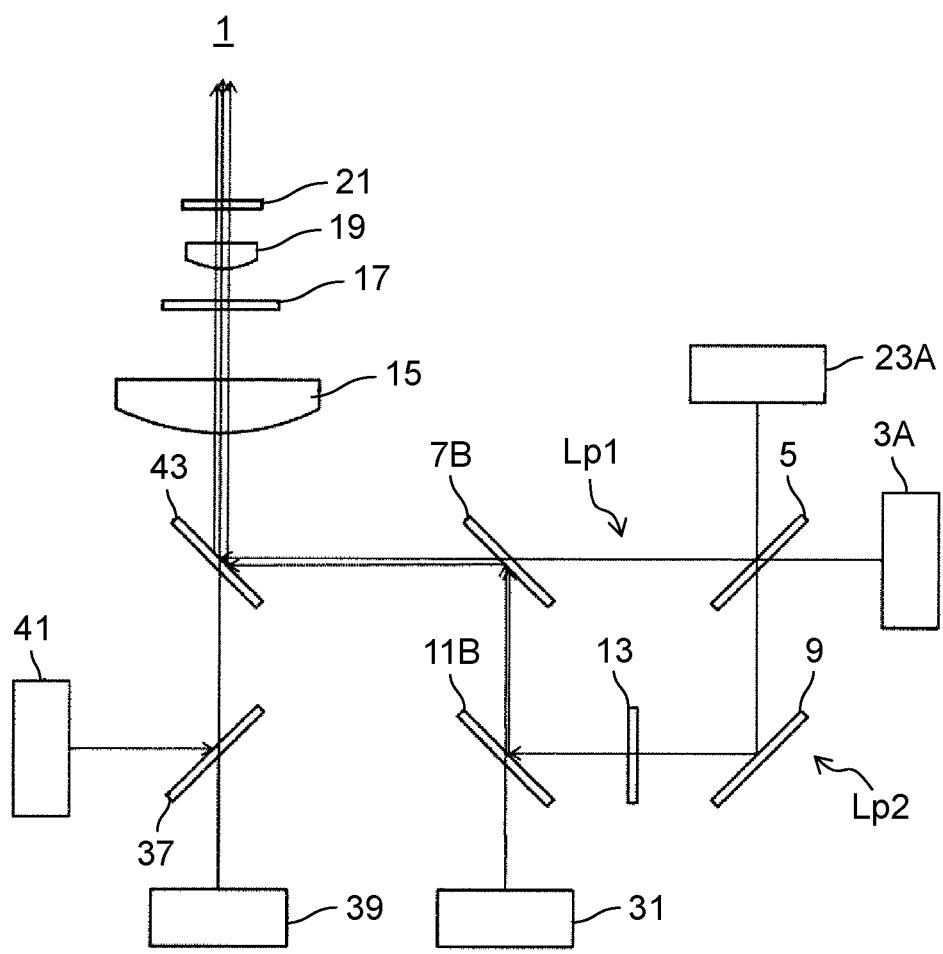
FIG. 5 is a schematic diagram illustrating a configuration of a light source device in a fourth exemplary embodiment of the present disclosure.

FIG. 5 is a schematic diagram illustrating a configuration of light source device 1C in the third exemplary embodiment of the present disclosure.

Similarly to the third exemplary embodiment, light source device 1C of the fourth exemplary embodiment has a configuration in which another light source is added to light source device 1A of the second exemplary embodiment. With respect to the configuration except the above point and the point to be described below, light source device 1C of the fourth exemplary embodiment is in common with light source device 1A of the second exemplary embodiment and light source device 1B of the third exemplary embodiment.

Light source device 1C includes first light source 3A, second light source 23A, third light source 31, sixth light source 39, and seventh light source 41. Light source device 1C further includes half mirror 5, mirror 9, retardation plate 13, third dichroic mirror 11B, fourth polarized light combination mirror 7B, fourth dichroic mirror 43, and third polarized light combination mirror 37.

First light source 3A corresponds to first light source 3, and second light source 23A corresponds to second light source 23. First light source 3A and second light source 23 emit laser light of the same color, for example, red laser light.

The light emitted from first light source 3A is separated into first light Lh1 that travels to first optical path Lp1 by passing through half mirror 5 and second light Lh2 that travels to second optical path Lp2 by being reflected by half mirror 5. First light Lh1 traveling on first optical path Lp1, which is a straight optical path, enters fourth polarized light combination mirror 7B. Second light Lh2 traveling on second optical path Lp2, which is a bypass optical path, is reflected by mirror 9, and its optical path is thereby bent by about 90°, so that second light Lh2 travels to third dichroic mirror 11B.

Retardation plate 13 is disposed between mirror 9 and third dichroic mirror 11B. Second light Lh2 reflected by mirror 9 passes through retardation plate 13, so that the phase of second light Lh2 is inclined by 90°. For example, second light Lh2, which is P-polarized before entering retardation plate 13, is converted into S-polarization when passing through retardation plate 13.

Third dichroic mirror 11B transmits the emitted light from third light source 31 and reflects the light from mirror 9.

Third light source 31 and first light source 3A emit light in different wavelength ranges, and third light source 31 emits, for example, blue laser light. Third dichroic mirror 11B combines the blue light from third light source 31 and red second light Lh2 from mirror 9. The combined light travels from third dichroic mirror 11B toward fourth polarized light combination mirror 7B.

Fourth polarized light combination mirror 7B transmits the light from half mirror 5 and reflects the light from third dichroic mirror 11B, thereby combining red first light Lh1, red second light Lh2, and the blue light. The combined light travels toward fourth dichroic mirror 43.

Sixth light source 39 and seventh light source 41 emit laser light that is the same in color but different in polarization. For example, sixth light source 39 emits P-polarized green laser light, and seventh light source 41 emits S-polarized green laser light. Solid-state light source elements 3a of seventh light source 41 are arranged to be rotated by 90° with respect to respective ones of solid-state light source elements of sixth light source 39.

Third polarized light combination mirror 37 transmits light of one type of polarization and reflects light of the other type of polarization, thereby combining both types of light. For example, third polarized light combination mirror 37 transmits the P-polarized green light from sixth light source 39 and reflects the S-polarized green light from seventh light source 41, thereby combining both types of green light. The combined green light is emitted toward fourth dichroic mirror 43.

Dichroic mirror 43 transmits light of one color and reflects light of the other two colors, thereby combining the light of three colors. Dichroic mirror 43 reflects, for example, red light and blue light incident from fourth polarized light combination mirror 7B and transmits green light from third polarized light combination mirror 37. As a result, the combined light of three colors is emitted toward lens 15.

4-2. Advantageous Effects and the Like

As described above, in light source device 1C according to the fourth exemplary embodiment, light of one color among light of three colors is separated by half mirror 5, and the number of light beams is accordingly increased, so that speckles can be reduced.

Fifth Exemplary Embodiment

A fifth exemplary embodiment will be described below with reference to FIG. 6.

5-1. Configuration

Figure 6:
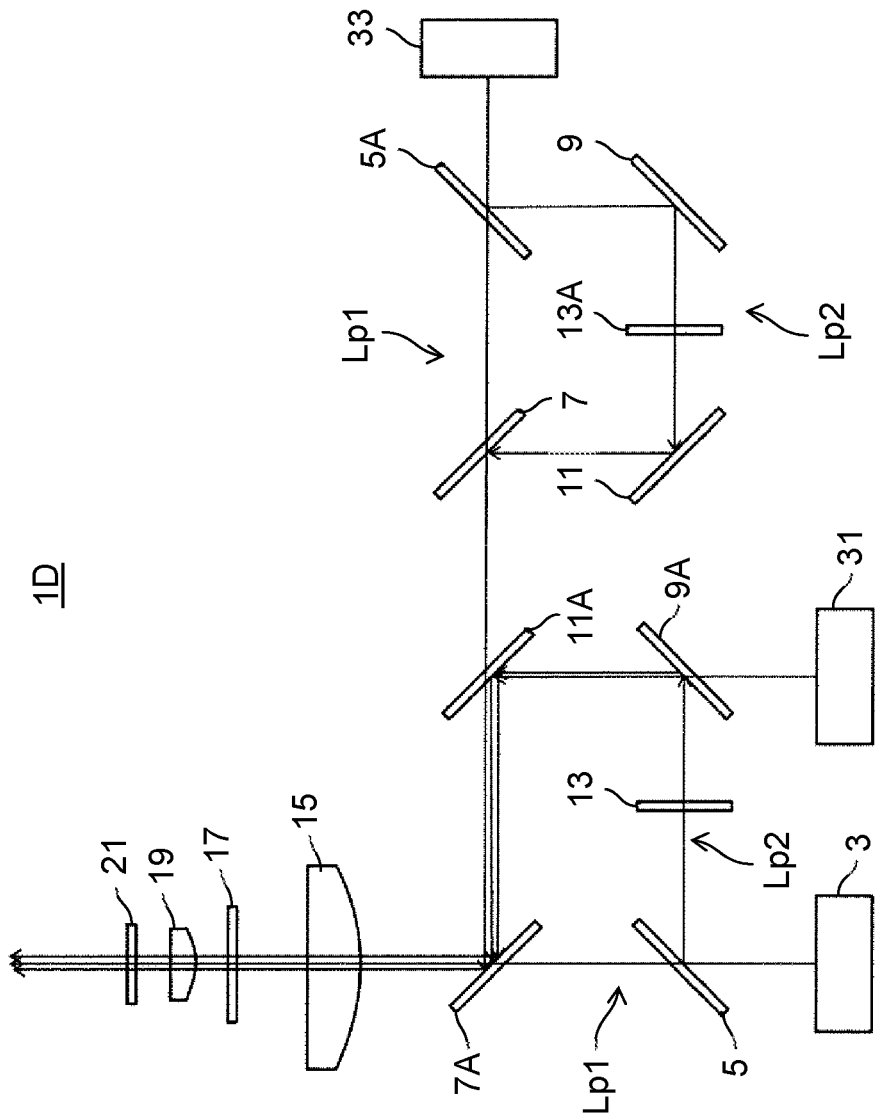
FIG. 6 is a schematic diagram illustrating a configuration of a light source device in a fifth exemplary embodiment of the present disclosure.

FIG. 6 is a schematic diagram illustrating a configuration of light source device 1D in the fifth exemplary embodiment of the present disclosure.

Light source device 1D of the fifth embodiment is configured as follows. Light source device 1B of the third embodiment and light source device 1C of the fourth embodiment are combined, one light source device is provided for each color, light of two colors among three colors, and bypass routes are formed for light of two colors among the three colors to generate combined light. With respect to the configuration except the above point and the point to be described below, light source device 1D of the fifth exemplary embodiment is in common with light source device 1B of the third exemplary embodiment and light source device 1C of the fourth exemplary embodiment.

Light source device 1D includes first light source 3, third light source 31, and fourth light source 33. Light source device 1D further includes half mirror 5, second polarized light combination mirror 7A, retardation plate 13, first dichroic mirror 9A, and second dichroic mirror 11A, and these components form first optical path Lp1 and second optical path Lp2 that are for light of one color. Light source device 1D further includes half mirror 5A, mirrors 9, 11, retardation plate 13A, and first polarized light combination mirror 7, and these components form first optical path Lp1 and second optical path Lp2 that are for light of another color.

Three light sources of first light source 3, third light source 31, and fourth light source 33 emit laser light of three colors in mutually different wavelength regions. For example, first light source 3 emits P-polarized green laser light, third light source 31 emits blue laser light, and fourth light source 33 emits P-polarized red laser light.

Similarly to the third exemplary embodiment, the green emitted light emitted from first light source 3 is separated into green first light Lh1 and green second light Lh2 by half mirror 5, and green first light Lh1 and green second light Lh2 enter second polarized light combination mirror 7A respectively through first optical path Lp1 and second optical path Lp2. The blue emitted light emitted from third light source 31 also passes through first dichroic mirror 9A, is reflected by second dichroic mirror 11A, and enters second polarized light combination mirror 7A.

Similarly to the first exemplary embodiment, the red emitted light emitted from fourth light source 33 is separated into red first light Lh1 and red second light Lh2 by half mirror 5A, and red first light Lh1 and red second light Lh2 enter second polarized light combination mirror 7A respectively through first optical path Lp1 and second optical path Lp2. First light Lh1 and second light Lh2 in different types of polarization states are combined on second polarized light combination mirror 7A, and are emitted toward second dichroic mirror 11A in a state where the number of light beams is doubled. On second dichroic mirror 11A, green second light Lh2, the blue light, and the red light in which the number of light beams is doubled are combined.

Green first light Lh1 and second light Lh2 in different types of polarization states are combined on second polarized light combination mirror 7A, so that the number of light beams is doubled. Further, green light the number of light beams of which is doubled, blue light, and red light the number of light beams of which is doubled are combined and emitted from second polarized light combination mirror 7A.

5-2. Advantageous Effects and the Like

As described above, since light source device 1D according to the fifth embodiment can double the number of light beams of light of two colors among the three colors, it is possible to obtain the number of light beams to be obtained from five light sources although light source device 1D actually has three light sources; therefore, speckles can be reduced.

Sixth Exemplary Embodiment

A sixth exemplary embodiment will be described below with reference to FIG. 7.

6-1. Configuration

Figure 7:
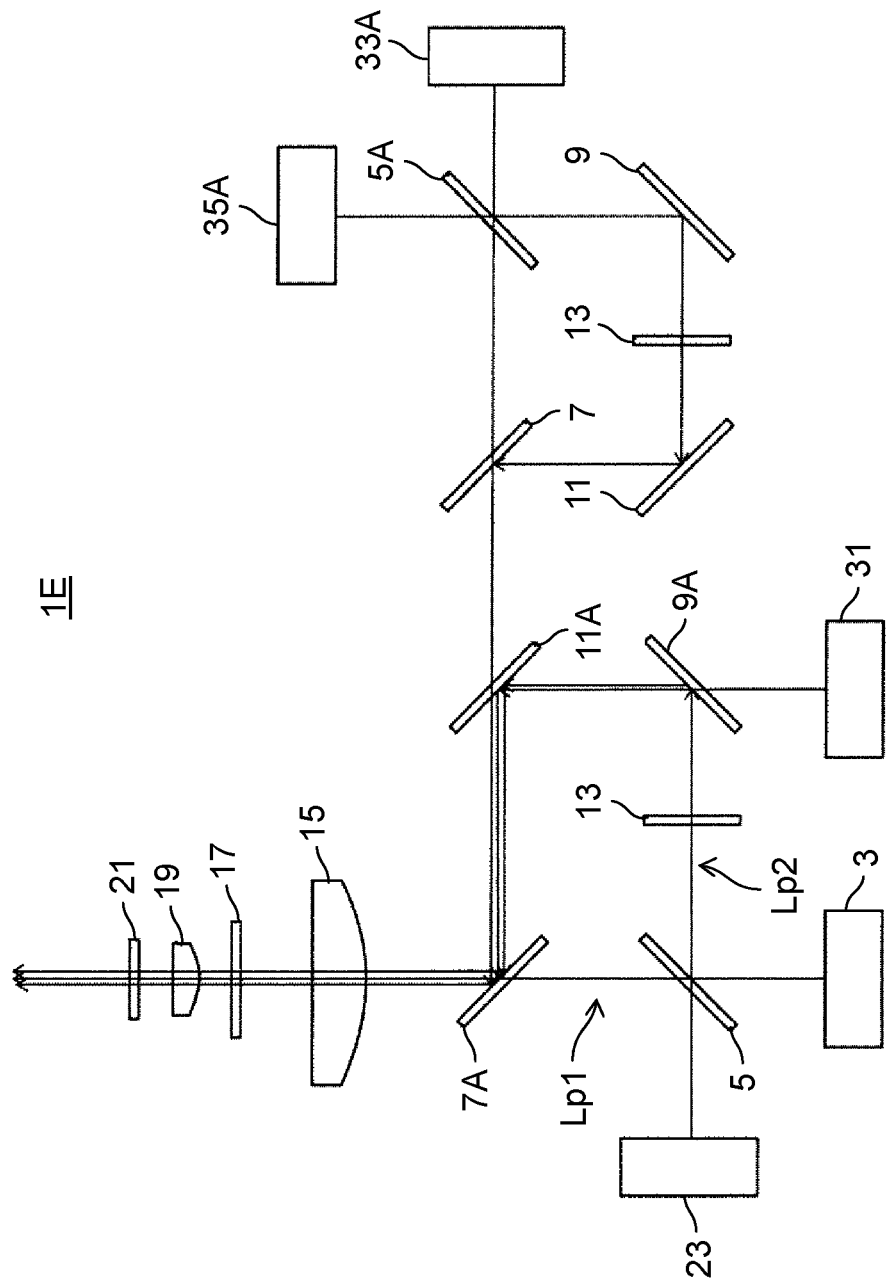
FIG. 7 is a schematic diagram illustrating a configuration of a light source device in a sixth exemplary embodiment of the present disclosure.

FIG. 7 is a schematic diagram illustrating a configuration of light source device 1E in the sixth exemplary embodiment of the present disclosure.

Light source device 1E of the sixth exemplary embodiment is configured as follows. Light source device 1B of the third embodiment and light source device 1C of the fourth embodiment are combined, two pairs of light sources of two colors are provided, and bypass routes are formed for light of two colors among the three colors to generate combined light. With respect to the configuration except the above point and the point to be described below, light source device 1E of the sixth exemplary embodiment is in common with light source device 1B of the third exemplary embodiment and light source device 1C of the fourth exemplary embodiment.

Light source device 1F includes first light source 3, second light source 23, third light source 31, fourth light source 33A, and fifth light source 35A. Fourth light source 33A and fifth light source 35A of light source device 1F respectively correspond to first light source 3A and second light source 23A of the fourth exemplary embodiment. Light source device 1F further includes half mirror 5, second polarized light combination mirror 7A, retardation plate 13, first dichroic mirror 9A, and second dichroic mirror 11A, and these components form first optical path Lp1 and second optical path Lp2 that are for light of one color. Light source device 1D further includes half mirror 5A, mirrors 9, 11, retardation plate 13A, and first polarized light combination mirror 7, and these components form first optical path Lp1 and second optical path Lp2 that are for light of another color.

6-2. Advantageous Effects and the Like

As described above, since light source device 1E according to the sixth exemplary embodiment can double the number of light beams of light of two colors among the three colors, it is possible to obtain the number of light beams to be obtained from seven light sources although light source device 1E actually has five light sources, therefore, speckles can be reduced.

Seventh Exemplary Embodiment

A seventh exemplary embodiment will be described below with reference to FIG. 8.

7-1. Configuration

Figure 8:
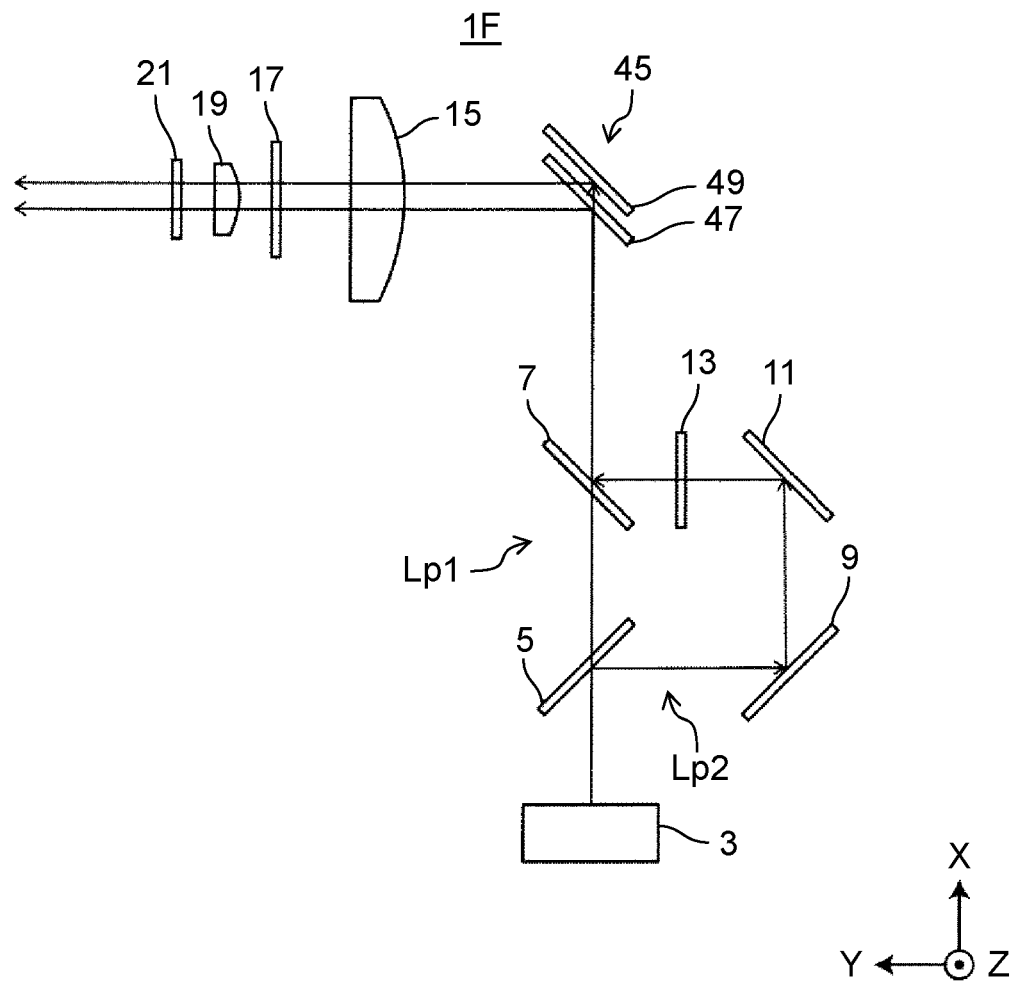
FIG. 8 is a schematic diagram illustrating a configuration of a light source device in a seventh exemplary embodiment of the present disclosure.

FIG. 8 is a schematic diagram illustrating light source device 1F in the seventh exemplary embodiment of the present disclosure.

Light source device 1F of the sixth exemplary embodiment has a configuration in which reflection module 45 that further increases the number of light beams is added to light source device 1 of the first exemplary embodiment. With respect to the configuration except the above point and the point to be described below, light source device 1F of the sixth exemplary embodiment is in common with light source device 1 of the first exemplary embodiment.

Light source device 1F includes reflection module 45 in addition to light source device 1. Reflection module 45 is disposed on an optical path such that the light emitted from first polarized light combination mirror 7 enters reflection module 45. Reflection module 45 includes; first reflection mirror 47 that reflects part of incident light and transmits the other part; and second reflection mirror 49 that totally reflects part of incident light. Second reflection mirror 49 is disposed behind first reflection mirror 47 and in parallel to first reflection mirror 47. The light having passed through first reflection mirror 47 is totally reflected by second reflection mirror 49.

Figure 9:
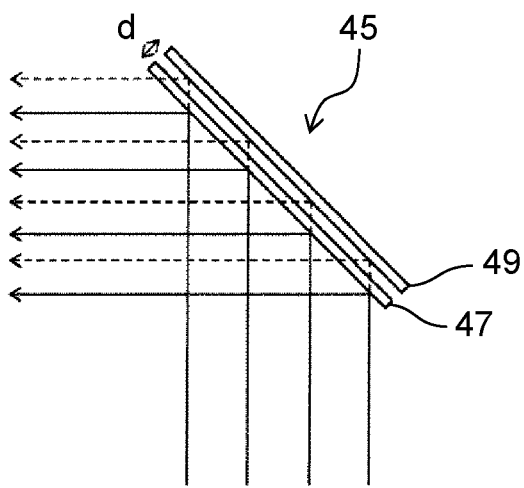
FIG. 9 is a schematic diagram illustrating a configuration of a reflection module.

As illustrated in FIG. 9, a mirror that is half-mirror coated may be employed as first reflection mirror 47. An interval d between first reflection mirror 47 and second reflection mirror 49 is adjusted such that the density of light beams of incident light becomes twice. Alternatively, as first reflection mirror 47, it is possible to employ, instead of a half-mirror coated mirror, a slit mirror in which strip-shaped mirrors are arranged at intervals.

Figure 10:
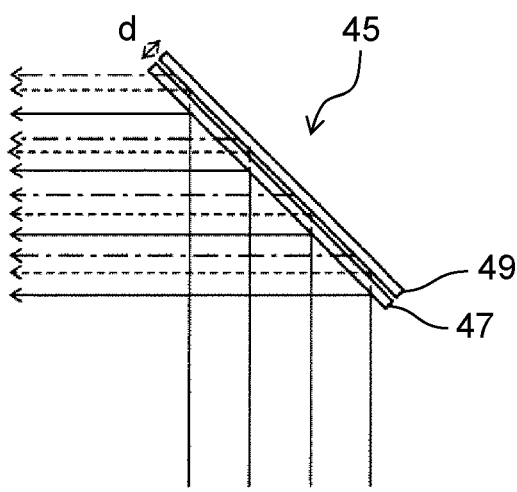
FIG. 10 is a schematic diagram illustrating a configuration of a reflection module.

Alternatively, as illustrated in FIG. 10, as first reflection mirror 47, it is possible to employ a mirror in which, for example, a 30% reflection coating film is formed on an incident surface for combined light. The interval d between first reflection mirror 47 and second reflection mirror 49 is adjusted such that the density of light beams of incident light becomes three times or more.

Note that reflection module 45 can be combined not only with light source device 1 of the first exemplary embodiment but with each of light source devices 1A to 1F of the second to sixth exemplary embodiments.

7-2. Advantageous Effects and the Like

As described above, in light source device 1F according to the sixth exemplary embodiment, reflection module 45 can increase the number of light beams of the light in which the light having traveled on the straight optical path and the light having traveled on the bypass route are combined, so that speckles can be further reduced.

Eighth Exemplary Embodiment

An eighth exemplary embodiment will be described below with reference to FIG. 11.

Figure 11:
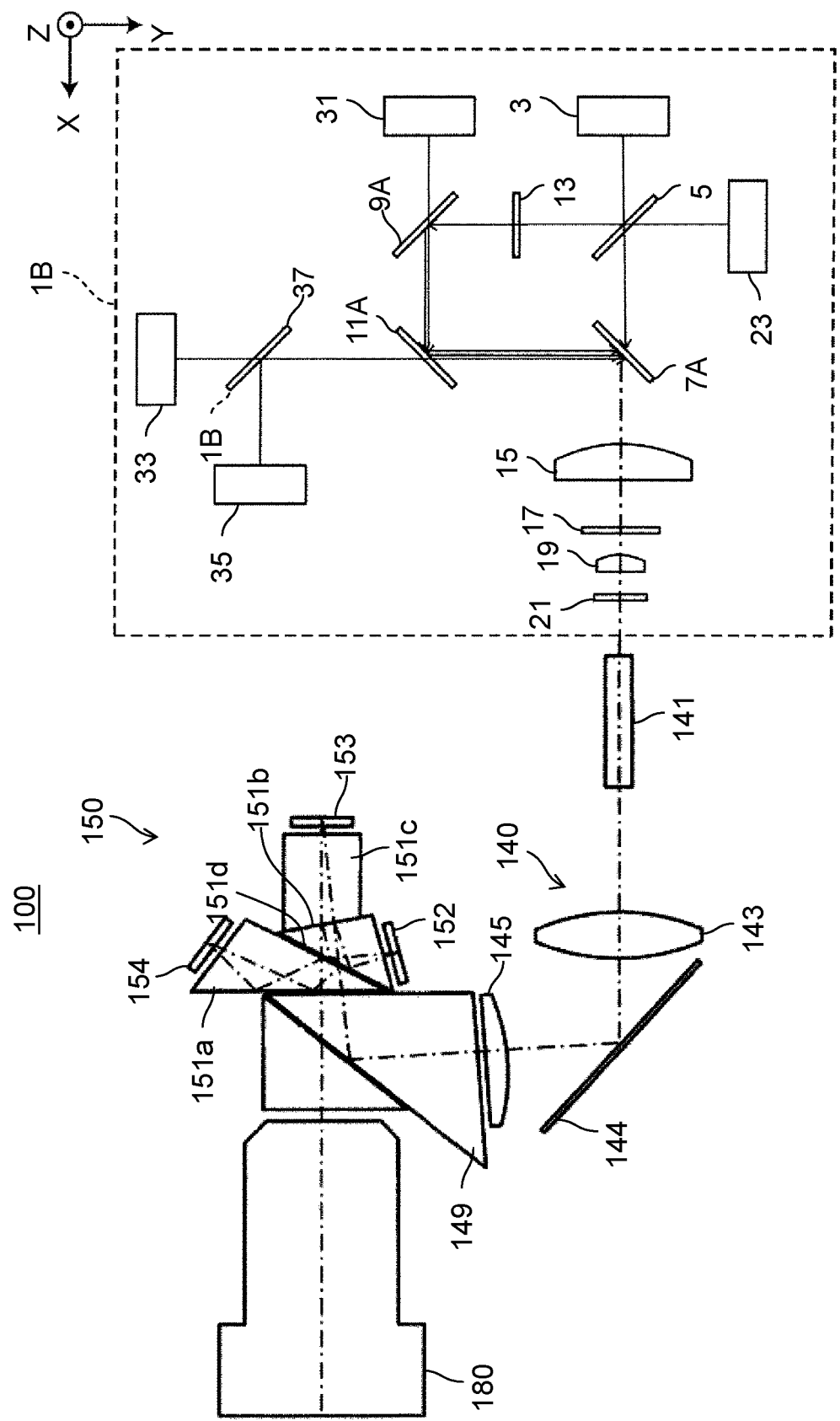
FIG. 11 is a schematic diagram illustrating a configuration of a projection image display device in an eighth exemplary embodiment of the present disclosure.

FIG. 11 is a schematic diagram illustrating a configuration of a projection image display device in the eighth exemplary embodiment of the present disclosure.

Projection image display device 100 of the eighth exemplary embodiment includes, for example, light source device 1B of the second exemplary embodiment, light guide 140 that guides light incident from light source device 1B to light modulator 150, light modulator 150 that modulates incident light on the basis of an external signal, and projection lens unit 180 that magnifies and projects the light modulated by light modulator 150. Note that projection image display device 100 may use any of light source devices 1C to 1G instead of light source device 1B. Projection image display device 100 is a so-called digital light processing (DLP) (registered trademark) projector.

Light emitted from light source device 1B enters light guide 140. Light guide 140 includes rod integrator 141, lens 143, mirror 144, and lens 145. Light of three colors emitted from diffuser plate 21 enters rod integrator 141, thereby becomes white light, and enters light modulator 150 through lens 143, mirror 144, and lens 145.

Light modulator 150 includes light guide prism 149, prisms 151a, 151b, 151c, and light modulation elements 152, 153, 154. Light guide prism 149 guides the light from lens 145, to prism 151a. Prism 151a has film 151d having a dichroic mirror function of separating incident white light into three colors of blue, green, and red, combines light of each of the three colors reflected by light modulation elements 152, 153, 154, and emits the combined light to projection lens unit 180 as image light.

Film 151*d* separates, for example, the incident white light into, for example, red light, green light, and blue light. Since white light is generated using laser light of three colors, there is no loss of light even when the light is separated into light in narrow wavelength regions as compared with a case where white light is generated using a rotating phosphor.

Light modulation elements 152, 153, 154 are each, for example, a digital micromirror device (DMD). The red light, the blue light, the green light separated by prisms 151 respectively enter light modulation element 152, light modulation element 153, and light modulation element 154. When these pieces of light are reflected by respective ones of light modulation elements 152, 153, 154, the pieces of light are modulated on the basis of an external signal. The pieces of modulated light of those colors are combined again by prisms 151 and are then emitted.

Projection lens unit 180 magnifies image light emitted from light modulator 150 and projects the emitted image light to, for example, a screen.

OTHER EXEMPLARY EMBODIMENTS

As described above, the above exemplary embodiments have been described as examples of the techniques disclosed in the present application. However, the techniques in the present disclosure are not limited to the above exemplary embodiments, and can also be applied to exemplary embodiments in which change, substitution, addition, omission, and the like are performed. Furthermore, the components described in the above exemplary embodiments may be combined to make a new exemplary embodiment.

As described above, the exemplary embodiments have been described to exemplify the techniques in the present disclosure. For that purpose, the accompanying drawings and the detailed description have been provided. Therefore, the components described in the accompanying drawings and in the detailed description not only include the components essential for solving the problem but also include, in order to exemplify the above techniques, components that are not essential for solving the problem. For this reason, it should not be immediately construed that those non-essential components are essential only because that those non-essential components are illustrated in the accompanying drawings or described in the detailed description.

The above exemplary embodiment is provided to exemplify the techniques in the present disclosure. Therefore, it is possible to make various changes, replacements, additions, omissions, and the like, within the scope of the claims and equivalents thereof.

Figure 12:
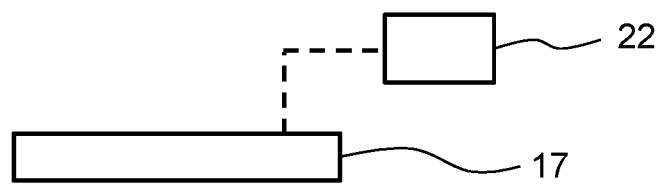
FIG. 12 is a schematic diagram illustrating a configuration of a diffuser plate in another exemplary embodiment of the present disclosure.

For example, as illustrated in FIG. 12, light source device 1 according to the first exemplary embodiment may further include actuator 22 that vibrates diffuser plate 17. As a result, speckles can be further reduced.

Overview of Exemplary Embodiments (1) A light source device of the present disclosure includes: a first light source including a plurality of solid-state light source elements that are arrayed in two-dimensional directions at a predetermined pitch and emit light of first linear polarization; a half mirror that reflects and transmits emitted light from the first light source and separates the emitted light into first light traveling to a first optical path and second light traveling to a second optical path; a polarized light combination mirror that performs transmission and reflection in accordance with type of polarization, and combines the first light and the second light; an optical path change element that is disposed on the second optical path and reflects the second light to guide the second light to the polarized light combination mirror; and a retardation plate that is disposed on the second optical path and converts the second light into second linear polarization inclined with respect to the first linear polarization. The optical path change element is disposed such that point images of the first light and point images of the second light on the polarized light combination mirror are alternately arranged in a short-diameter direction of the point images.

With these components, the emitted light is separated by the half mirror, and the point images of light beams of the first light traveling on the first optical path and point images of light beams of the second light traveling on the second optical path are alternately arranged on the first polarized light combination mirror, so that light source multiplexing can be achieved. As a result, a light source device with reduced speckles can be provided.

(2) The light source device of (1) includes a second light source including a plurality of solid-state light source elements that are arrayed in two-dimensional directions at a predetermined pitch and emit light of first linear polarization. The half mirror reflects and transmits emitted light from the second light source, and separates the emitted light from the second light source into third light traveling to the first optical path and fourth light traveling to the second optical path. The polarized light combination mirror combines the first light, the second light, the third light, and the fourth light, and the optical path change element reflects the fourth light and guides the fourth light to the polarized light combination mirror. The retardation plate converts the fourth light into the second linear polarization inclined with respect to the first linear polarization. The first light source and the second light source are disposed such that the point images of the emitted light from the first light source and point images of the emitted light from the second light source on the half mirror are alternately arranged in a long-diameter direction of the point images. The optical path change element is disposed such that point images of the third light and point images of the fourth light on the polarized light combination mirror are alternately arranged in a short-diameter direction of the point images.

With these components, the emitted light from each of the first light source and the second light source is separated by the half mirror, and the point images of the light beams of each of the first light and the third light traveling on the first optical path and the point images of light beams of each of the second light and the fourth light traveling on the second optical path are alternately arranged on the polarized light combination mirror, so that light source multiplexing can be achieved. As a result, a light source device with reduced speckles can be provided.

(3) The light source device of (1) or (2) includes a diffuser plate through which the light combined on the polarized light combination mirror passes through.

(4) In the light source device of (3), the diffuser plate can vibrate.

(5) The light source device of (1) to (4) includes: a slit mirror that the combined light mirror enters; and a reflection mirror that is disposed behind the slit mirror and in parallel to the slit mirror.

(6) The light source device of (1) to (4) includes: a first reflection mirror having a reflection film that reflects some proportion of the combined light, the reflection film disposed on an incident surface that the combined light enters; and a second reflection mirror that is disposed behind the first reflection mirror and in parallel to the first reflection mirror.

(7) The light source device of (1) to (6) includes: a light modulation element that modulates light incident from the light source device, based on an external signal; and a projection lens unit that magnifies and projects the light modulated by the light modulation element.

INDUSTRIAL APPLICABILITY

The present disclosure is applicable to a light source device or a projection image display device such as a projector.

REFERENCE MARKS IN THE DRAWINGS

1, TA, 1B, 1C, 1D, 1E, 1F: light source device
3, 3A: first light source
3a: solid-state light source element
5, 5A: half mirror
7: first polarized light combination mirror
7A: second polarized light combination mirror
7B: fourth polarized light combination mirror
9: mirror
9A: first dichroic mirror
11: mirror
11A: second dichroic mirror
11B: third dichroic mirror
13, 13A: retardation plate
15: lens
17: diffuser plate
19: lens
21: diffuser plate
22: actuator
23: second light source
31: third light source
33, 33A: fourth light source
35, 35A: fifth light source
37: third polarized light combination mirror
39: sixth light source
41: seventh light source
43: fourth dichroic mirror
45: reflection module
47: first reflection mirror
49: second reflection mirror
100: projection image display device
140: light guide
141: rod integrator
143: lens
144: mirror
145: lens
150: light modulator
151a, 151b, 151c: prism
151d: film
152: light modulation element
153: light modulation element
154: light modulation element
180: projection lens unit
Lt1: first emitted light
Lt2: second emitted light
Lh1: first light
Lh2: second light
Lh3: third light
Lh4: fourth light
Lm1, Lm2: combined light
Lp1: first optical path
Lp2: second optical path

The invention claimed is:

1. A light source device comprising:
a first light source including a plurality of solid-state light source elements that are two-dimensionally arrayed at a predetermined pitch and emit light of first linear polarization;
a half mirror that reflects and transmits emitted light from the first light source and separates the emitted light into first light traveling to a first optical path and second light traveling to a second optical path;
a polarized light combination mirror that transmits and reflects light in accordance with type of polarization, and combines the first light and the second light;
an optical path change element that is disposed on the second optical path and reflects the second light to guide the second light to the polarized light combination mirror; and
a retardation plate that is disposed on the second optical path and converts the second light into second linear polarization inclined with respect to the first linear polarization, wherein the optical path change element is disposed with point images of the first light and point images of the second light on the polarized light combination mirror being alternately arranged in a short-diameter direction of the point images of the first light and the point images of the second light.

2. The light source device according to claim 1, further comprising a second light source including a plurality of solid-state light source elements that are two-dimensionally arrayed at a predetermined pitch and emit light of first linear polarization, wherein
the half mirror reflects and transmits emitted light from the second light source, and separates the emitted light from the second light source into third light traveling to the first optical path and fourth light traveling to the second optical path,
the polarized light combination mirror combines the first light, the second light, the third light, and the fourth light,
the optical path change element reflects the fourth light to guide the fourth light to the polarized light combination mirror,
the retardation plate converts the fourth light into the second linear polarization,
the first light source and the second light source are disposed with point images of the emitted light from the first light source and point images of the emitted light from the second light source on the half mirror being alternately arranged in a long-diameter direction of the point images of the emitted light from the first light source and the point images of the emitted light from the second light source, and
the optical path change element is disposed with point images of the third light and point images of the fourth light on the polarized light combination mirror being alternately arranged in a short-diameter direction of the point images of the third light and the point images of the fourth light.

3. The light source device according to claim 1, further comprising a diffuser plate through which the light combined on the polarized light combination mirror passes.

4. The light source device according to claim 3, wherein the diffuser plate is configured to vibrate.

5. The light source device according to claim 3, further comprising an actuator that vibrates the diffuser plate.

6. The light source device according to claim 1, further comprising:
   a slit mirror that the light combined on the polarized light combination mirror enters; and
   a reflection mirror that is disposed behind the slit mirror and in parallel to the slit mirror.

7. The light source device according to claim 1, further comprising:
   a first reflection mirror having a reflection film that reflects part of the light combined on the polarized light combination mirror, the reflection film being disposed on an incident surface that the combined light enters; and
   a second reflection mirror that is disposed behind the first reflection mirror and in parallel to the first reflection mirror.

8. The light source device according to claim 1, wherein the optical path change element includes:
   a first mirror that reflects the second light reflected by the half mirror, and
   a second mirror that reflects the second light reflected by the first mirror and guides the second light to the polarized light combination mirror.

9. The light source device according to claim 8, further comprising a third light source that emits light of a color different from a color of light emitted by the first light source, wherein
   the first mirror is a dichroic mirror, and
   the third light source is disposed with the light emitted by the third light source being reflected by the second mirror after passing through the first mirror.

10. The light source device according to claim 8, further comprising a fourth light source that emits light of a color different from a color of light emitted by the first light source, wherein
    the second mirror is a dichroic mirror, and
    the fourth light source is disposed with the light emitted by the fourth light source being guided to the polarized light combination mirror after passing through the second mirror.

11. A projection image display device comprising:
    the light source device according to claim 1;
    a light modulation element that modulates light incident from the light source device, based on an external signal; and
    a projection lens unit that magnifies and projects the light modulated by the light modulation element.

* * * * *